United States Patent
Grothmann et al.

(10) Patent No.: US 10,521,716 B2
(45) Date of Patent: Dec. 31, 2019

(54) COMPUTER-ASSISTED ANALYSIS OF A DATA RECORD FROM OBSERVATIONS

(71) Applicants: Ralph Grothmann, München (DE); Christoph Tietz, Ottobrunn (DE); Hans-Georg Zimmermann, Starnberg/Percha (DE)

(72) Inventors: Ralph Grothmann, München (DE); Christoph Tietz, Ottobrunn (DE); Hans-Georg Zimmermann, Starnberg/Percha (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 887 days.

(21) Appl. No.: 14/849,292

(22) Filed: Sep. 9, 2015

(65) Prior Publication Data
US 2016/0071006 A1  Mar. 10, 2016

(30) Foreign Application Priority Data
Sep. 10, 2014  (EP) .................................. 14184183

(51) Int. Cl.
  *G06N 3/08*  (2006.01)
  *G06N 20/00*  (2019.01)
  *G05B 13/02*  (2006.01)
(52) U.S. Cl.
  CPC ............. *G06N 3/08* (2013.01); *G05B 13/027* (2013.01); *G06N 20/00* (2019.01)
(58) Field of Classification Search
  CPC ........ G05B 13/027; C21D 8/02; Y02P 60/216
  (Continued)

(56) References Cited

U.S. PATENT DOCUMENTS 7,945,523 B2 * 5/2011 Hofmann ............... G05B 17/02
  706/12
8,396,689 B2 * 3/2013 Pfeifer ................. G05B 23/024
  702/182
(Continued)

FOREIGN PATENT DOCUMENTS

DE          19904974 A1    8/2000
WO       WO9425933 A1    11/1994

OTHER PUBLICATIONS

'Elements of Artificial Neural Networks': Mehrotra, MIT press, 1997.*
(Continued)

Primary Examiner — Robert A Cassity
Assistant Examiner — Peter D Coughlan
(74) Attorney, Agent, or Firm — Lempia Summerfield Katz LLC

(57) ABSTRACT

Computer-assisted analysis of a data record from observations is provided. The data record contains, for each observation, a data vector that includes values of input variables and a value of a target variable. A neuron network structure is learned from differently initialized neuron networks based on the data record. The neuron networks respectively include an input layer, one or more hidden layers, and an output layer. The input layer includes at least a portion of the input variables, and the output layer includes the target variable. The neuron network structure outputs the mean value of the target variables of the output layers of the neuron networks. Sensitivity values are determined by the neuron network structure and stored. Each sensitivity value is assigned an observation and an input variable. The sensitivity value includes the derivative of the target variable of the assigned observation with respect to the assigned input variable.

20 Claims, 4 Drawing Sheets

(58) Field of Classification Search
USPC .......................................................... 706/25
See application file for complete search history.

(56) References Cited

U.S. PATENT DOCUMENTS

2003/0187567 A1* 10/2003 Sulatisky ................. F01N 3/20
                                                      701/104
2010/0100248 A1    4/2010 Minto

OTHER PUBLICATIONS

'Decision Support Systems for Pharmaceutical Formulation Development Based on Artificial Neural Networks': Mendyk, 2010, Decision Support Systems, Book edited by: Chiang S. Jao, ISBN 978-953-7619-64-0,, pp. 99-121.*
European Search Report for European Application No. 14184183.3-1807, dated Mar. 26, 2015, with English Translation.
European Office Action for European Patent Application No. 14 184 183.3-1216, dated Feb. 4, 2019.
Opitz, David W., and Jude W. Shavlik. "Actively searching for an effective neural network ensemble." Connection Science 8.3-4 (1996), pp. 337-354.
Zhou, Zhi-Hua, Jianxin Wu, and Wei Tang. "Ensembling neural networks: many could be better than all." Artificial Intelligence 137.1-2 (2002), pp. 239-263.
Zurada, Jacek M., Aleksander Malinowski, and Shiro Usui. "Perturbation method for deleting redundant inputs of perceptron networks." Neurocomputing 14.2 (1997), pp. 177-193.
Mehrotra Kishan et al: "Elements of Artificial Neural Networks", In: "Elements of Artificial Neural Networks", MIT Press, XP055547693, (1996), pp. 1-344.

* cited by examiner

COMPUTER-ASSISTED ANALYSIS OF A DATA RECORD FROM OBSERVATIONS

This application claims the benefit of EP 14184183.3, filed on Sep. 10, 2014, which is hereby incorporated by reference in its entirety.

BACKGROUND

The present embodiments relate to computer-assisted analysis of a data record from observations.

In a number of areas of application, it is desirable to use a data record of observations to derive a connection between input variables and a target variable within the observations. In this case, the data record contains for each observation a data vector that includes the values of input variables and an assigned value of a target variable.

In the field of the regulation of technical systems, there is frequently a need to recognize the influence and/or the relevance of state variables of the technical system on and/or to a target variable of the technical system in order, for example, to learn on the basis thereof a suitable data-driven model that predicts the target variable as a function of relevant input variables. The regulation of the technical system may be suitably stipulated based on the prediction by the data-driven model. For example, the technical system may be a gas turbine with state variables that may include various temperatures, fuel amounts, fuel mixtures, positions of turbine blades and the like. For such a gas turbine, for example, the target variable may be the emission of nitrogen oxides or combustion chamber humming (e.g., increased vibrations in the combustion chamber). By suitable modeling of the gas turbine based on the input variables that have the greatest effect on the target variable, nitrogen oxide emissions and/or combustion chamber humming may be forecasted, and a high level of the nitrogen oxide emission and/or combustion chamber humming may thus be counteracted by suitably changing manipulative variables.

A further field of application is the analysis of production charges. In this case, each observation relates to corresponding parameters of the production of the production charge under consideration. The target variable corresponds to a quality parameter of the charge produced. The quality parameter may be represented, for example, by the number of failures of technical units produced for a charge within a time period after startup of the respective unit to the extent that the production charge refers to the fabrication of such a technical unit. By determining which production parameters have a particularly large influence on the quality of the production charge, the production processes may be analyzed, and the quality of the fabricated products may be improved by changing the input variables with a particularly large influence on the production.

There are known statistical tests that may be used to analyze a data record from observations with regard to the relevance of input variables to a target variable. However, the methods may not recognize nonlinear relationships and are not suitable for highly dimensional data vectors with a large number of input variables.

SUMMARY AND DESCRIPTION

The scope of the present invention is defined solely by the appended claims and is not affected to any degree by the statements within this summary.

The present embodiments may obviate one or more of the drawbacks or limitations in the related art. For example, computer-assisted analysis of a data record from observations that may be used simply and reliably to determine the influence of input variables on at least one target variable is provided.

In accordance with one embodiment of a method, a data record from observations that contains for each observation a data vector that includes the values of a plurality of input variables and the value of a target variable is processed. The data vector may also include a plurality of target variables. In this case, the method described below is carried out for each of the target variables (e.g., in parallel or sequentially).

In one act (e.g., act a), a neuron network structure is learned from a plurality of differently initialized neuron networks based on the data record. In other words, the data record constitutes the training data of the neuron network structure. The neuron networks of the neuron network structure respectively include an input layer, one or more hidden layers, and an output layer. The input layer of a respective neuron network includes at least a portion of the input variables, and the output layer of a respective neuron network includes the target variable. In this case, the neuron network structure outputs the mean value of the target variables of the output layers of the neuron networks. In the case of a plurality of target variables, the neuron network structure may be configured such that the output layer of the respective neuron network includes the plurality of target variables, and the neuron network structure outputs the mean value for each of the target values.

In another act of the method (e.g., act b), sensitivity values are determined by the learned neuron network structure and stored. Each sensitivity value is assigned an observation and an input variable, and the respective sensitivity value includes the derivative (e.g., mathematical derivative) of the target variable of the assigned observation with respect to the assigned input variable. In other words, the sensitivity value constitutes the above derivative, or the sensitivity value is a value that is a function of the derivative (e.g., being a linear dependence between sensitivity value and derivative, as it may be possible for there to be a non-linear dependence). In the case of a plurality of target variables, appropriate sensitivity values are determined for each of the plurality of target variables.

The method according to one or more of the present embodiments easily facilitates the use of an ensemble of learned neuron networks to determine the influence of input variables on a target variable. Averaging the outputs of the individual neuron networks eliminates fluctuations in the target variables of the individual networks. By determining the derivative of the target variable with reference to the input variables, it is possible for such input variables with a large influence on the target variable to be recognized quickly. The sensitivity values determined and stored are further processed suitably in an embodiment and/or visualized on a user interface, as is described further below in more detail.

In one embodiment, the sensitivity values are determined via a modified error back propagation of respective input variables in the neuron network structure, in the modified error back propagation weightings between the layers of the neuron network structure not being adjusted, and the derivative, included in the residual error, of the target variable of the assigned observation with respect to the assigned input variable being output instead of the residual error. A configuration of the embodiment is explained more closely in the detailed description. It is to be taken into account in this case that the error back propagation is known in the context of the learning of neuron networks. The error back propagation propagates the respective input variables through the neuron network from the input layer to the output layer, and the error between output and actual target variable is subsequently back propagated to the input layer. In this case, the weightings between the layers are modified in order to keep the remaining residual error as small as possible. The embodiment described here is based on the knowledge that a simple modification of the error back propagation, in the case of which the weightings are not changed and the derivative is output instead of the residual error, may be used to calculate appropriate sensitivity values in a simple way.

In a further embodiment, the neuron networks of the neuron network structure are feed-forward networks. In a further configuration, an input layer of a respective neuron network includes a randomly selected portion of the input variables. In other words, the respective input layer is randomly fed only a portion of all the input variables.

In a further configuration, the stored sensitivity values are suitably visualized on a graphical user interface (e.g., a monitor). A user hereby learns which input variables are particularly relevant for the corresponding target variable. In an embodiment, the visualization is configured such that a matrix composed of a plurality of rows and columns is reproduced on the graphical user interface. A respective row represents an input variable, and a respective column represents an observation. Alternatively, a respective column represents an input variable, and a respective row represents an observation. In this case, a respective entry, relevant to a row and column, of the matrix visually codes a sensitivity value that belongs to the observation and input variable of the corresponding row and column of the entry.

In one embodiment, the sign of the derivative that is included in the sensitivity value of the respective entry of the above-described matrix is coded. In a variant, this is performed via a color coding. A positive derivative may represent a different color than a negative derivative, and the color intensity of the corresponding color is greater the larger the absolute value of the derivative. A simple and intuitive visualization of the sensitivity values is hereby provided.

As an alternative or in addition to the matrix of sensitivity values described above, in a further configuration, the sum of the absolute values of the sensitivity values is visualized on the graphical user interface over all observations for a respective input variable (e.g., in the form of a bar diagram). The bars may be arranged in ascending or descending order of the sums. In one variant, the bar with the largest sum of the absolute values of the sensitivity values is normalized to 1, and all other bars are represented relative to the bar. In other words, the relative values of the length of the individual bars with respect to the longest bar may be read from the bar diagram. The relative value for the bar with the largest sum has the value 1.

In another variant of the method, the observations are assigned to consecutive instants. The observation for a respective instant includes input variables that were determined at the respective instant, and a target variable (and possibly also a plurality of target variables) that was determined at the respective instant, at a later instant, or at an earlier instant. This makes it possible to learn causal relationships (e.g., relationships directed to the future) between input variables and the target variable and possibly also retro-causal relationships (e.g., relationships directed to the past) between input variables and the target variable using the neuron network structure of the method according to one or more of the present embodiments. If appropriate, in addition to the input variables at the respective instant, an observation assigned to a respective instant may also include input variables that were determined at one or more past instants.

In a further configuration of the method, the acts a) and b) are repeated iteratively. A number of input variables, for which the sum of the absolute values of the sensitivity values is greatest over all observations, is stored after act b) and when act a) is next carried out, is no longer considered as input variables in the input layers of the neuron networks of the neuron network structure. The number of input variables may also include only an individual input variable with the largest sum of the absolute values of the sensitivity values. In this case, the input variables stored within the scope of this embodiment very effectively represent input variables that have the greatest influence on the target variable.

In one variant of the embodiment, additionally considered in the neuron network structure as input variables are one or more pseudo input variables having values that are represented in the data vectors by random numbers. The distribution of the random numbers may be oriented to the distributions of the input variables. The iterative repetition of the acts a) and b) is aborted when in act b) the number of input variables for which the sum of the absolute values of the sensitivity values over all observations is greatest includes a pseudo input variable. This provides a very good abort criterion based on the knowledge that input variables with influence equated to random numbers are not relevant to the target variable.

One field of application of the present embodiments is the recognition of relationships between input variables and a target variable during operation of a technical system. In this case, the data record composed of observations includes data vectors including state variables of the technical system at consecutive operating instants. A data vector corresponds to a respective operating instant, and this data vector includes the determined values of the input variables at the respective operating instant (and possibly at past operating instants), and the value of the target variable at the respective operating instant or an operating instant that is in the past or in the future with respect to the respective operating instant.

The method may be used, for example, for a technical system in the form of a gas turbine. The target variable may be the emission of nitrogen oxides. The input variables may include any desired state variables or alterable manipulated variables in the gas turbine (e.g., temperatures, flow speeds, fuel mixing ratios, positions of turbine blades and the like).

If appropriate, the data record analyzed in the method according to one or more of the present embodiments and composed of observations may also include data vectors of different production charges of a product. A production charge may also consist only of one produced product. In this case, a respective data vector includes, as values of the input variables, parameters of the production of the corresponding production charge, and as values of the target variable, a quality measure of the corresponding production charge. For example, the data record may relate to the production of x-ray tubes that are installed in a computer tomograph. The quality measure may be represented, for example, by whether and how often produced products fail within a period of use of the product.

The method according to one or more of the present embodiments may also be used to modulate raw material prices. In this case, the data record composed of observations includes data vectors that include a raw material price as a value of the target variable, and factors affecting the raw material price (e.g., interest rates, exchange rates or other raw material prices) as values of the input variable.

In addition to the method described above, the one or more of the present embodiments also relate to a computer program product including a non-transitory computer-readable storage medium having a program code for carrying out the method according to one or more of the present embodiments or one or more variants of the method when the program code is executed on a computer.

One or more of the present embodiments also include a non-transitory computer-readable storage medium including a computer program having a program code for carrying out the method or one or more variants of the method when the program code is executed on a computer.

DETAILED DESCRIPTION

A method according to one or more of the present embodiments is used to recognize relationships between input variables and a target variable from a data record composed of a plurality of observations. The individual observations are each represented by a data vector that contains values of input variables and a value of the target variable for the corresponding observation. The observations may be different depending on the embodiment. The observations may represent recorded/measured state variables of a technical system, production charges, or raw material prices and the affecting factors, as already mentioned above. The sensitivity of the target variable to changes in the individual input variables is determined by calculating a corresponding sensitivity value. For this purpose, an ensemble of a plurality of neuron networks is learned. One variant of such an ensemble is reproduced, by way of example, in FIG. 1. Only one individual target variable is considered below, but the method may also be extended to a plurality of target variables without any problems.

Figure 1:
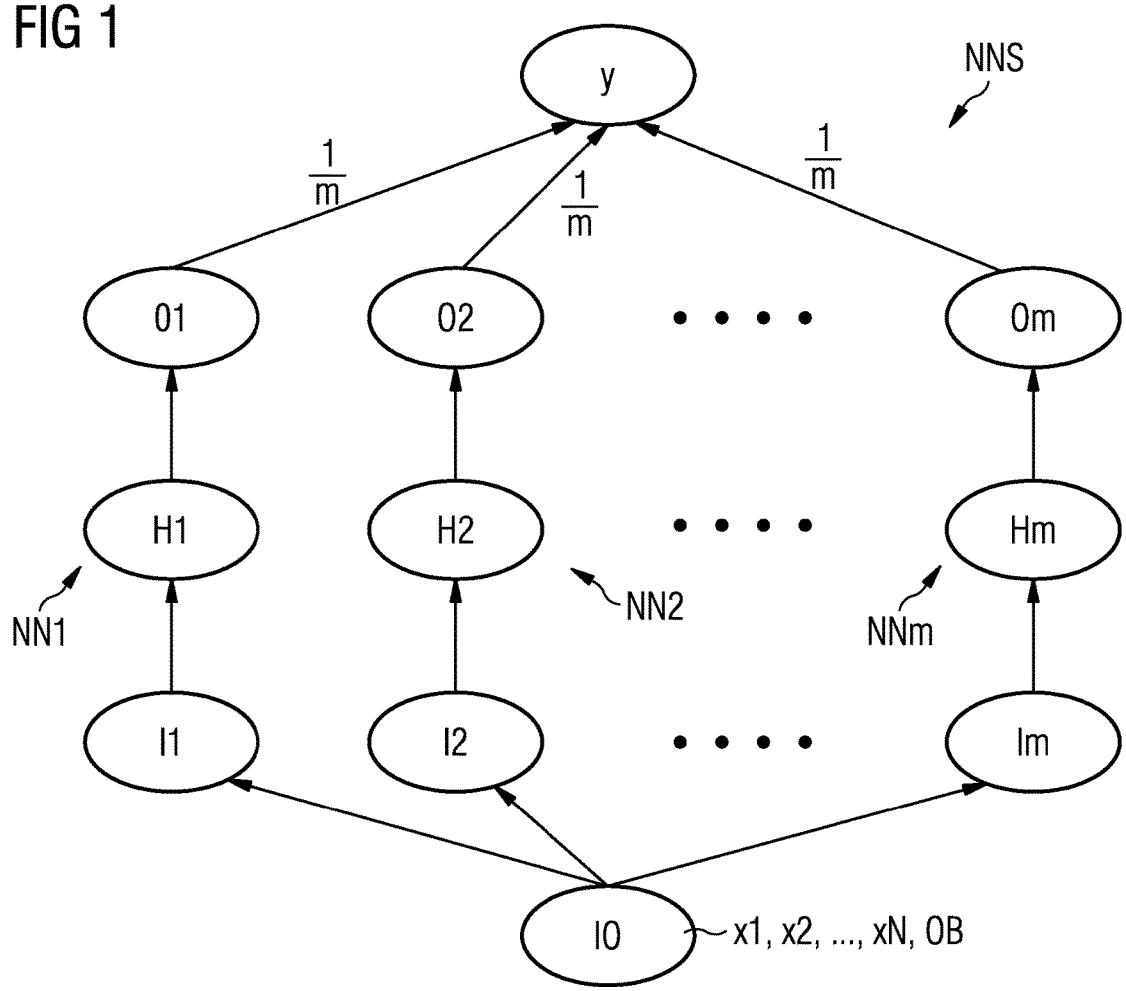
FIG. 1 shows an ensemble of a plurality of neuron networks that is used to calculate sensitivity values in one embodiment of a method.

The ensemble in FIG. 1 forms a neuron network structure NNS composed of m neuron networks that are indicated by NN1, NN2, . . . , NNm in FIG. 1. Each network is a feed-forward network having an input layer, a hidden layer and an output layer. The network NN1 includes the input layer I1, the hidden layer H1, and the output layer O1. The network NN2 includes the input layer I2, the hidden layer H2, and the output layer O2. The indexing of these layers with ascending indices continues to the neuron network NNm that includes the input layer Im, the hidden layer Hm and the output layer Om. A portion of the input variables, which are denoted x1, x2, . . . , xN in FIG. 1, is respectively supplied to the individual input layers I1 to Im. In this case, each individual input layer of the input layers I1 to Im only ever represents a portion of the input variables x1 to xN. Further below, subscript indices are also used to denote the same input variables (e.g., xi=$x_t$ (i=1, . . . , N)).

In the variant described here, it is always randomly stipulated which portion of the input variables is taken into account in the corresponding input layer for the individual input layers. The supply of the individual input variables to the layers I1 to Im is represented by the connection of the input layer I0 to the individual layers I1 to Im according to the illustration in FIG. 1. The layer I0 contains all input variables x1 to xN. Input variables are filtered out by random selection using the corresponding arrows to the input layers I1 to Im. In a manner known, the input layers of the individual neuron networks are adjoined by the hidden layers H1 to Hm and, building on this, the output layers O1 to Om. The individual output layers represent a corresponding target variable contained in the data vectors. In this case, the output target variables of all output layers are averaged, as indicated by arrows having the quotient 1/m. The averaged target variable is therefore obtained as the output from the output layers of the neuron networks and is denoted y. Fluctuations in the outputs of the individual layers are smoothed by averaging the outputs of the output layers. The output of the target variable y may also be interpreted as an output layer of the illustrated neuron network structure NNS.

The network structure NNS in FIG. 1 is learned with the observations or observables OB (e.g., all data vectors having corresponding values of input variables and the target variable are used as training data for the neuron network structure). Learning is carried out in a manner known using error back propagation. The learned network structure in FIG. 1 is then used to determine the partial derivatives of the target variable of each observation with respect to the individual input variables. These partial derivatives represent how sensitive the target variable of a corresponding observation is to changes in the input variables. The derivatives determined are stored as sensitivity values and are visualized in a suitable manner in order to provide a user with information on how greatly the target variable depends on an input variable in the data record under consideration.

Figure 2:
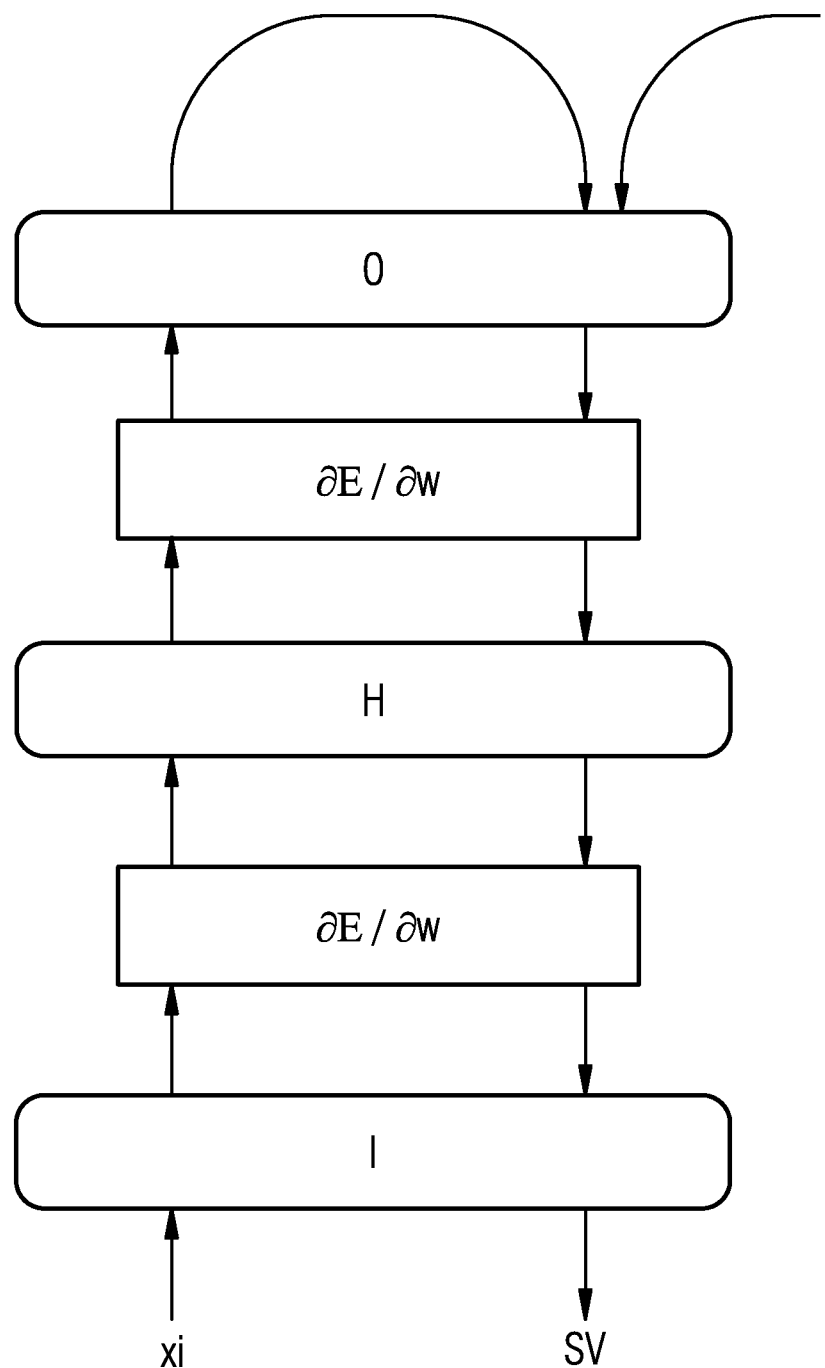
FIG. 2 shows a schematic illustration of modified error back propagation that is used to determine sensitivity values in one embodiment of the method.

In the embodiment described here, the sensitivity values are calculated based on a modification of the error back propagation that was already mentioned above and is used to learn neuron networks. Such a calculation of the sensitivity values is indicated in FIG. 2. In this figure, I denotes the totality of the input layers I0, I1, . . . , Im of the neuron network structure NNS from FIG. 1. H likewise denotes the totality of hidden layers H1, H2, . . . , Hm. In the same manner, O represents the output layers O1, O2, . . . , Om in combination with the output layer that outputs the averaged target variable y. Within the scope of the modified error back propagation in FIG. 2, each input variable xi (i=1, . . . , N) from each observation is propagated through the network from the layer I to the layer O. The layer O outputs the averaged target variable $y_t$, where t represents the observation currently considered from all T observations. The error $E_t = y_t - y_t^d$ between the output target variable $y_t$ and the actual target variable $y_t^d$ from the data vector of the observation is then back propagated through the network. In this case, the weightings w between the layers are conventionally adjusted based on the influence on the error $E_t$, as indicated by $\partial E/\partial w$. The residual error $\partial(x_i)$ is conventionally obtained based on the outputs from the layer I as follows:

$$d(x_i) = \frac{1}{T}\sum_t |d_t(x_i)| = \frac{1}{T}\sum_t \left|\frac{\partial E_t}{\partial x_i}\right| = \frac{1}{T}\sum_t \left|(y_t - y_t^d)\frac{\partial y_t}{\partial x_i}\right| \quad (1)$$

Within the scope of the embodiment described here, $(y_t - y_t^i)$ is set to 1, and the weightings w are not adjusted. This minor modification of the conventional error back propagation results in sensitivity values SV for the input variables in the form of the derivatives $$\frac{\partial y_t}{\partial x_t}$$

for the target variable $y_t$ of a corresponding observation. In this manner, the sensitivity values SV may be determined in a very sophisticated manner by modifying an error back propagation.

In the embodiment described here, the individual sensitivity values SV for each observation and each input variable are intuitively visualized in the form of a matrix on a graphical user interface (e.g., a computer monitor). Such a visualization is schematically reproduced in FIG. 3 described below. Reference symbols and a coordinate system having the abscissa OB and the ordinate xi are included in the illustration in FIG. 3 for the purpose of illustrating the visualization. The reference symbols and the coordinate system are not reproduced in the actual visualization.

The illustrated matrix M contains a plurality of rows and a plurality of columns, only the rows being explicitly represented by horizontal lines. These lines may also be omitted in the visual illustration. There is one row for each input variable xi and one column for each observation OB. In this case, each entry in the matrix M represents a sensitivity value $$SV = \frac{\partial y_t}{\partial x_i}$$

for the input variable xi according to the row and the observation with the index t according to the column. By way of example, the space for an entry of a sensitivity value SV is represented in the lowermost row of the matrix M. The width of the entry corresponds to the width of a column (not explicitly illustrated) of the matrix M.

The individual sensitivity values are coded using colors in the entire matrix. A corresponding color coding is reproduced only for the row Z of the matrix M for reasons of clarity. In the same manner, all other rows have the corresponding color coding that is not illustrated, however. In the embodiment described here, the color of the sensitivity value is used to stipulate whether the corresponding derivative of the target variable from the observation in the corresponding column with respect to the input variable according to the row is greater or less than zero. Negative derivatives are represented with a blue color, and positive derivatives are represented with a red color. In this case, other color combinations may also be used. In the illustration in FIG. 3, the blue color is indicated in the row Z by dotted regions, and the red color is indicated by hatched regions. If the derivative is equal to zero, the corresponding region is white. The absolute value of the derivative is coded using the intensity of the colors (e.g., the more intensive the color, the greater the absolute value of the corresponding derivative). In the illustration in FIG. 3, this intensity is indicated by the point density for blue regions and the line density for hatched regions.

Figure 3:
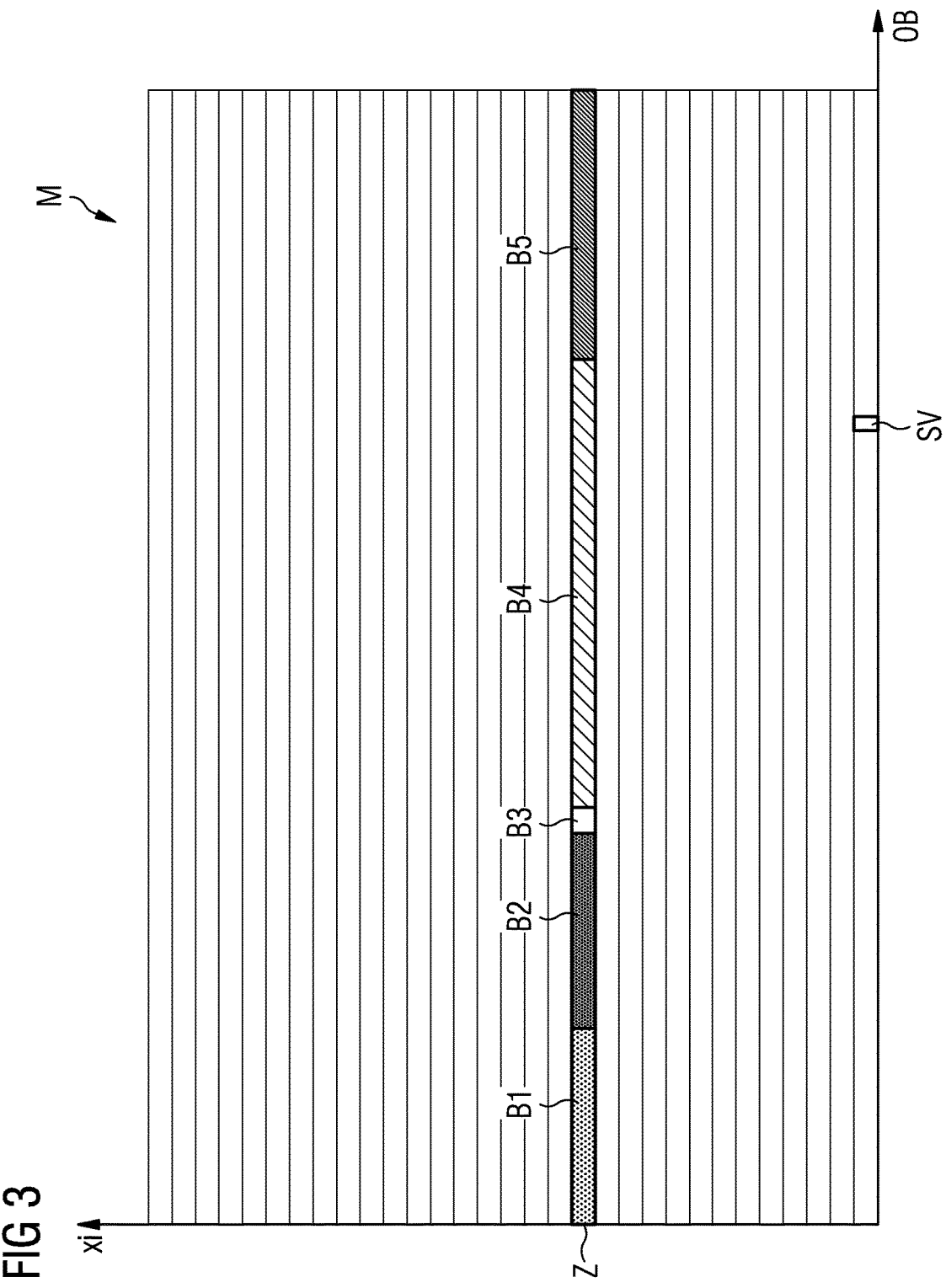
FIG. 3 shows a schematic illustration of a graphical reproduction of sensitivity values according to one embodiment of the method.

As shown in FIG. 3, the sensitivity values assume a small negative value (e.g., bar B1) for the row Z in the horizontal direction from left to right. The absolute values of the negative values become larger (e.g., bar B2). Observations in which the derivatives substantially have the value zero (e.g., bar B3) according to the sensitivity values then follow. This is then followed by a region with small positive derivatives (e.g., bar B4) that is adjoined by a region with larger positive derivatives (e.g., bar B5).

According to the illustration in FIG. 3, it is easily and intuitively conveyed to a user which input variable has a great influence on the target variable. If intensive blue and/or red color values result within a row, it is indicated to the user that the input variable according to the row has a great influence on the target variable. The user receives the information relating to whether the influence results in greater values or smaller values of the target variable. Consequently, during subsequent modeling of the behavior according to the data record using a data-driven model (e.g., using a neuron network), the user may take into account only input variables that have a strong influence on the input variable.

Figure 4:
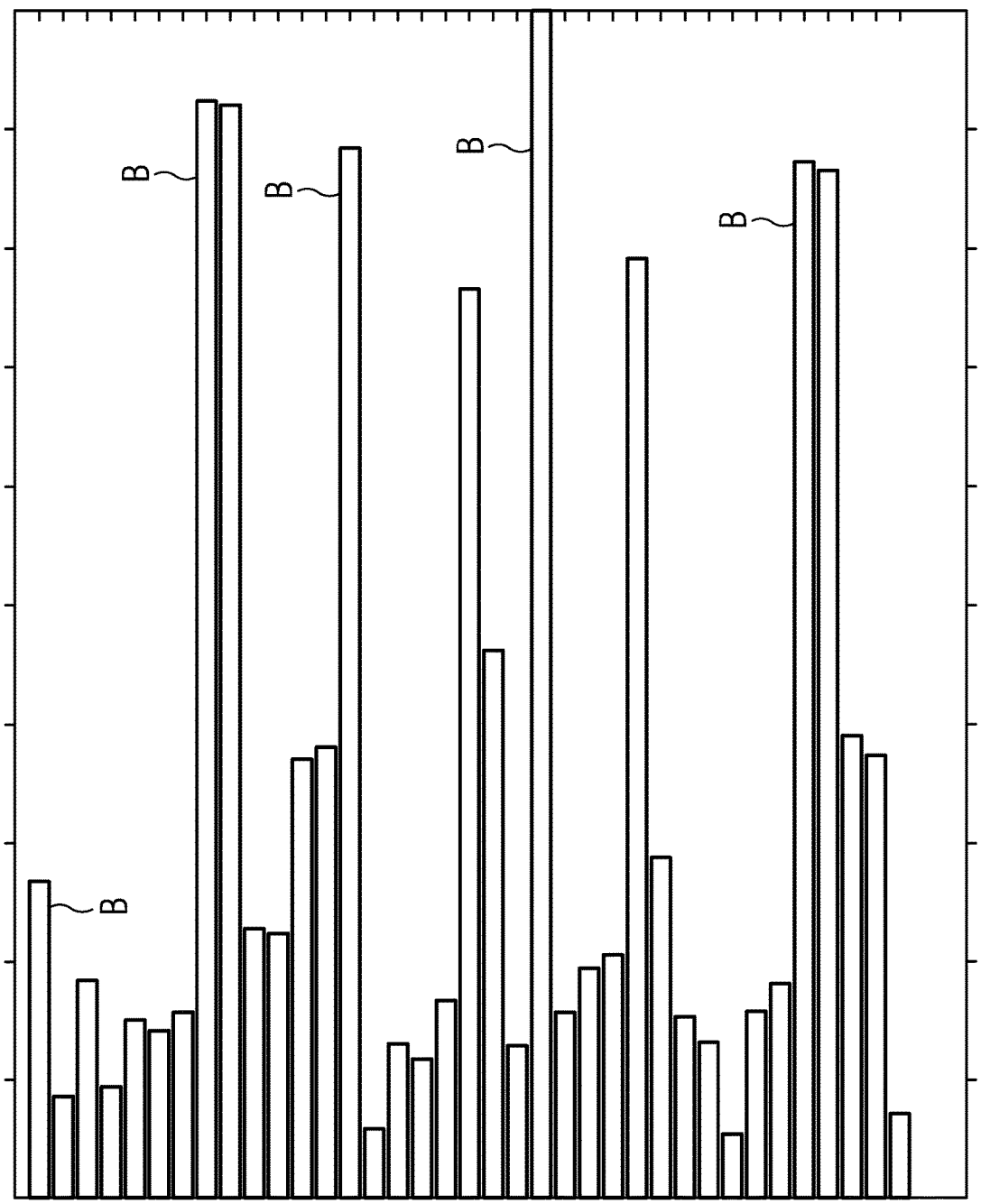
FIG. 4 shows a bar diagram for visualizing the importance of input variables according to one embodiment of the method.

FIG. 4 shows a further visualization that may be called up by a user on the graphical user interface in the embodiment described here. The reference symbols illustrated in FIG. 4 are not included in the actual visualization. According to this visualization, the sums of the absolute values of the sensitivity values in the respective rows from FIG. 3 (e.g., for respective input variables) are represented based on a bar diagram having a plurality of bars B (e.g., only partially denoted with this reference symbol). The length of the bars in the horizontal direction indicates the magnitude of the sum, whereas the vertical position of a bar is the position of the row from FIG. 3 that corresponds to the input variable represented by the bar. The bars may be normalized, with the result that the input variables having the largest sum have the bar length 1, and all other input variables are arranged relative thereto. In this manner, a user very quickly gains an overview of which input variables have a particularly strong influence on the target variable.

In the embodiment described here, the sums of the absolute values of the sensitivity values represented in FIG. 4 may also be processed further. During this further processing, one or more input variables having the largest sum are deleted, and the neuron network structure NNS from FIG. 1 is then re-learnt without these input variables. The sums corresponding to the illustration in FIG. 4 are again determined by the re-learnt network structure using the modified error back propagation, and one or more input variables having the largest sums are then deleted again. These steps of learning the neuron network structure with deleted input variables and deleting input variables again are repeated iteratively until an abort criterion is satisfied. This provides a more reliable statement relating to which input variables are particularly relevant to the target variable. These input variables are the iteratively deleted input variables.

In one embodiment, the neuron network structure according to FIG. 1 also contains a number of pseudo input variables that represent entries having random values in the data vectors of the data record. These pseudo input variables are randomly determined with a stipulated probability distribution (e.g., a uniform distribution or a Gaussian distribution). The choice of the distribution may be oriented to the distributions of the input variables. If appropriate, different input variables may also be determined with different probability distributions. In this variant, the above abort criterion is stipulated such that when deleted input variables contain pseudo input variables, the method is terminated. This is because it may be assumed in this case that the input variables deleted when the method is continued are not relevant to the target variable since there are already random variables that allegedly appear to have a greater influence on the target variable.

The embodiments described above have a number of advantages. For example, sensitivity values are determined in a simple manner by training an ensemble of neuron networks in combination with a modified error back propagation. The sensitivity values very effectively reflect the influence of the input variables on the target variable based on the derivative of the target variable with respect to the respective input variables. In addition, a simple and quickly comprehensible visualization of these sensitivity values based on a sensitivity matrix (FIG. 3) or a bar diagram (FIG. 4) is provided for a user. In one embodiment, input variables may be determined with a great influence on the target variable in an improved manner using an iterative process by deleting input variables with large sums of absolute values of sensitivity values and re-learning the neuron network. This destructive method is advantageous, for example, for data vectors having a large number of input variables since the destructive method is computationally very efficient in comparison with methods in which input variables with small sums of the absolute values of the sensitivity values are gradually deleted.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for computer-assisted analysis of a data record from observations, the data record containing for each observation a data vector that comprises values of a plurality of input variables and a value of a target variable, the method comprising:
    learning a neuron network structure from a plurality of differently initialized neuron networks based on the data record, the plurality of differently initialized neuron networks respectively comprising an input layer, one or more hidden layers, and an output layer, the input layer of a respective neuron network of the plurality of differently initialized neuron networks comprising at least a portion of input variables of the plurality of input variables, and the output layer of a respective neuron network of the plurality of differently initialized neuron networks comprising the target variable, the neuron network structure outputting a mean value of the target variables of the output layers of the plurality of differently initialized neuron networks;
    determining sensitivity values using the learned neuron network structure and storing the determined sensitivity values, each of the sensitivity values being assigned an observation and an input variable, and the respective sensitivity value including a derivative of the target variable of the assigned observation with respect to the assigned input variable; and
    visualizing the stored sensitivity values on a graphical user interface,
    wherein the sensitivity values are calculated based on a modification of an error back propagation, wherein weightings between the layers of the neuron network structure are unadjusted in the modified error back propagation.

2. The method of claim 1, wherein the determining comprises determining the sensitivity values via the modified error back propagation of respective input variables in the neuron network structure, in the modified error back propagation, weightings between the layers of the neuron network structure not being adjusted, and the derivative, included in a residual error, of the target variable of the assigned observation with respect to the assigned input variable being output instead of the residual error.

3. The method of claim 1, wherein the plurality of differently initialized neuron networks of the neuron network structure are feed-forward networks.

4. The method of claim 1, wherein an input layer of a respective neuron network of the plurality of differently initialized neuron networks comprises a randomly selected portion of the input variables.

5. The method of claim 1, wherein the visualization is configured such that a matrix composed of a plurality of rows and columns is reproduced on the graphical user interface, a respective row representing an input variable, and a respective column representing an observation, or vice versa, a respective entry, relevant to a row and column, of the matrix visually coding a sensitivity value that belongs to the observation and input variable in accordance with the row and column of the entry.

6. The method of claim 5, wherein the sign of the derivative that is included in the sensitivity value of the respective entry of the matrix is coded.

7. The method of claim 6, wherein the sign of the derivative that is included in the sensitivity value of the respective entry of the matrix is color coded.

8. The method of claim 6, wherein a positive derivative represents a different color than a negative derivative, and the color intensity of the corresponding color is greater the larger an absolute value of the derivative.

9. The method of claim 1, further comprising visualizing a sum of absolute values of the sensitivity values on the graphical user interface over all observations for a respective input variable.

10. The method of claim 9, wherein the sum of absolute values of the sensitivity values is visualized on the graphical user interface over all observations for a respective input variable in the form of a bar diagram, a bar with a largest sum of the absolute values of the sensitivity values being normalized to 1, and all other bars being represented relative to the bar.

11. The method of claim 1, wherein the observations are assigned to consecutive instants, the observation for a respective instant comprising input variables that were determined at the respective instant, and a target variable that was determined at the respective instant, at a later instant, or at an earlier instant.

12. The method of claim 1, wherein the learning and the determining are repeated iteratively, a number of input variables, for which a sum of absolute values of the sensitivity values is greatest over all observations, being stored after the determining and, when the learning is next carried out, no longer being considered as input variables in the input layers of the plurality of differently initialized neuron networks of the neuron network structure.

13. The method of claim 12, wherein additionally considered in the neuron network structure as input variables are one or more pseudo input variables having values that are represented in the data vectors by random numbers, an iterative repetition of the learning and the determining being aborted when in the determining the number of input variables for which the sum of the absolute values of the sensitivity values over all observations is greatest includes a pseudo input variable.

14. The method of claim 1, wherein the data record composed of observations includes data vectors comprising state variables of a technical system at consecutive operating instants, a data vector corresponding to a respective operating instant and comprising the values of the input variables at the respective operating instant, and the value of the target variable at the respective operating instant, a past operating instant, or a future operating instant.

15. The method of claim 14, wherein the technical system is a gas turbine.

16. The method of claim 15, wherein the target variable comprises an emission of nitrogen oxides or combustion chamber humming.

17. The method of claim 1, wherein the data record composed of observations comprises data vectors for different production charges of a product, a respective data vector including as values of the input variables parameters of the production of the corresponding production charge, and as a value of the target variable a quality measure of the corresponding production charge.

18. The method of claim 1, wherein the data record composed of observations comprises data vectors that include a raw material price as a value of the target variable, and factors affecting the raw material price as values of the input variables.

19. A computer program product comprising a non-transitory computer-readable storage medium having program code including instructions executable by a computer for computer-assisted analysis of a data record from observations, the data record containing for each observation a data vector that comprises values of a plurality of input variables and a value of a target variable, the instructions comprising:
   learning a neuron network structure from a plurality of differently initialized neuron networks based on the data record, the plurality of differently initialized neuron networks respectively comprising an input layer, one or more hidden layers, and an output layer, the input layer of a respective neuron network of the plurality of differently initialized neuron networks comprising at least a portion of input variables of the plurality of input variables, and the output layer of a respective neuron network of the plurality of differently initialized neuron networks comprising the target variable, the neuron network structure outputting a mean value of the target variables of the output layers of the plurality of differently initialized neuron networks;
   determining sensitivity values using the learned neuron network structure and storing the determined sensitivity values, each of the sensitivity values being assigned an observation and an input variable, and the respective sensitivity value including a derivative of the target variable of the assigned observation with respect to the assigned input variable; and
   visualizing the stored sensitivity values on a graphical user interface,
   wherein the sensitivity values are calculated based on a modification of an error back propagation, wherein weightings between the layers of the neuron network structure are unadjusted in the modified error back propagation.

20. In a non-transitory computer-readable storage medium having instructions executable by a computer for computer-assisted analysis of a data record from observations, the data record containing for each observation a data vector that comprises values of a plurality of input variables and a value of a target variable, the instructions comprising:
   learning a neuron network structure from a plurality of differently initialized neuron networks based on the data record, the plurality of differently initialized neuron networks respectively comprising an input layer, one or more hidden layers, and an output layer, the input layer of a respective neuron network of the plurality of differently initialized neuron networks comprising at least a portion of input variables of the plurality of input variables, and the output layer of a respective neuron network of the plurality of differently initialized neuron networks comprising the target variable, the neuron network structure outputting a mean value of the target variables of the output layers of the plurality of differently initialized neuron networks;
   determining sensitivity values using the learned neuron network structure and storing the determined sensitivity values, each of the sensitivity values being assigned an observation and an input variable, and the respective sensitivity value including a derivative of the target variable of the assigned observation with respect to the assigned input variable; and
   visualizing the stored sensitivity values on a graphical user interface,
   wherein the sensitivity values are calculated based on a modification of an error back propagation, wherein weightings between the layers of the neuron network structure are unadjusted in the modified error back propagation.

* * * * *